Dec. 15, 1925.   1,565,940
J. E. HILL
SAW SWAGE
Filed Jan. 27, 1925

J. E. Hill,
Inventor

By  Clarence A. O'Brien
Attorney

Patented Dec. 15, 1925.

1,565,940

UNITED STATES PATENT OFFICE.

JOHN E. HILL, OF POTTER, ARKANSAS.

SAW SWAGE.

Application filed January 27, 1925. Serial No. 5,102.

*To all whom it may concern:*

Be it known that I, JOHN E. HILL, a citizen of the United States, residing at Potter, in the county of Polk and State of Arkansas, have invented certain new and useful Improvements in Saw Swages, of which the following is a specification.

This invention relates to improvements in tools for use in connection with the teeth of a saw, and is more particularly adapted to a device for swaging the teeth of a crosscut saw.

One of the important objects of the present invention is to provide a saw swage, which is of such construction as to enable the adjacent teeth of a crosscut saw to be swaged simultaneously.

A further object is to provide a saw swage of the above-mentioned character, which is simple in construction, inexpensive, strong and durable, and further well adapted for the purpose for which it is designated.

Other objects and advantages of the invention will become apparent during the course of the following detailed description, taken in connection with the accompanying drawings.

In the accompanying drawing, forming a part of this specification:

Figure 1:
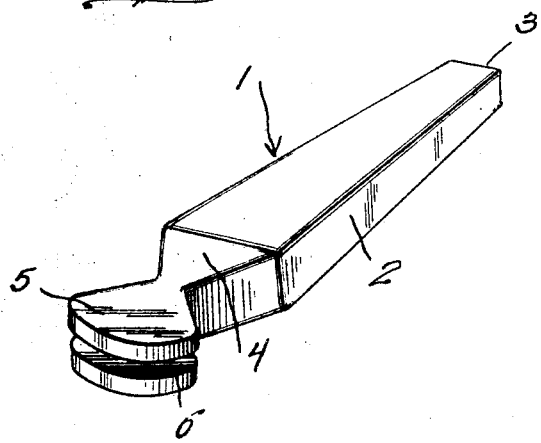
Figure 1 is a perspective view of the saw swage embodying my invention.

In the drawing, wherein for the purpose of illustration is shown the preferred embodiment of my invention, the numeral 1 designates generally my improved saw swage, the same comprising the solid body portion 2, which is formed of a suitable metal, the body being substantially flat and tapering gradually toward its upper end, the latter providing a striking head 3, for the purpose to be presently apparent.

The lower or enlarged end of the body 2, terminates in the substantially V-shaped portion 4. Formed on the apex of the V-shaped member 4 is the substantially fan-shaped portion 5.

Figure 2:
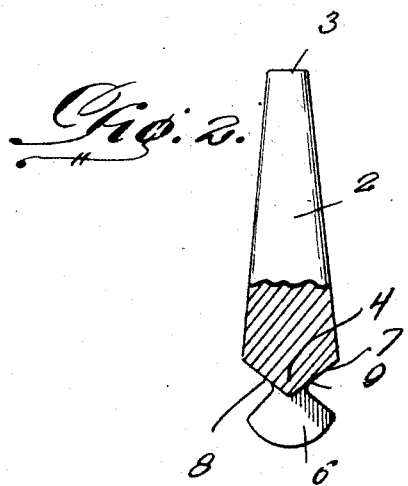
Figure 2 is a view, partly in elevation, partly in section.
Figure 3:
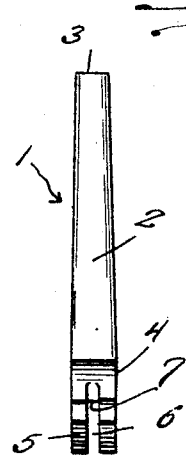
Figure 3 is an edge view thereof.

The fan-shaped portion 5 is split longitudinally as illustrated at 6, for its entire length, so that the intermediate portion 7 of the apex of the V-shaped member 4 will be disposed in the upper portion of the slot, as clearly illustrated in Figures 2 and 3. This construction provides the co-acting swaging spaces 8 and 9.

In use, the tool is positioned over the raker teeth of a crosscut saw, so that the slot 6 is disposed over the fork between one pair of adjacent teeth of the saw blade. The upper end 3 of the tool is then struck with a hammer and this operation results in the swaging faces 8 and 9 engaging the adjacent faces of the adjacent teeth of the crosscut saw blade, causing the latter to be moved outwardly in opposite directions simultaneously. The tool is then removed from between one pair of teeth and is placed in the adjacent pair in the same manner, until all of the raker teeth have been swaged.

The provision of a saw swage of the above-mentioned character will save considerable time and labor and will, at all times, be positive and efficient in carrying out the purposes for which it is designed. Furthermore, the simplicity with which the tool is constructed enables the same to be easily handled and operated.

While I have shown the preferred embodiment of my invention, it is to be understood that various changes in the size, shape, and arrangement of parts may be resorted to, without departing from the spirit of the invention or the scope of the appended claim.

Having thus described my invention, what I claim as new is:

A tool of the class described comprising a solid wedge-shaped body, the smaller end thereof providing a striking head, a substantially V-shaped portion formed on the larger end of the body, a substantially fan-shaped portion formed on the apex of the V-shaped portion and being slit longitudinally for its entire length, so that the intermediate portion of the apex of the V-shaped portion is disposed in said slit to provide a pair of swaging faces, the same being adapted for engagement with the adjacent faces of a pair of raker teeth of a saw blade.

In testimony whereof I affix my signature.

JOHN E. HILL.